Jan. 6, 1953 — E. O. LUNDE — 2,624,471
CAR BUFFER
Filed Dec. 13, 1946 — 2 SHEETS—SHEET 1

Inventor
Einar O. Lunde
George E. Cook
Attorney

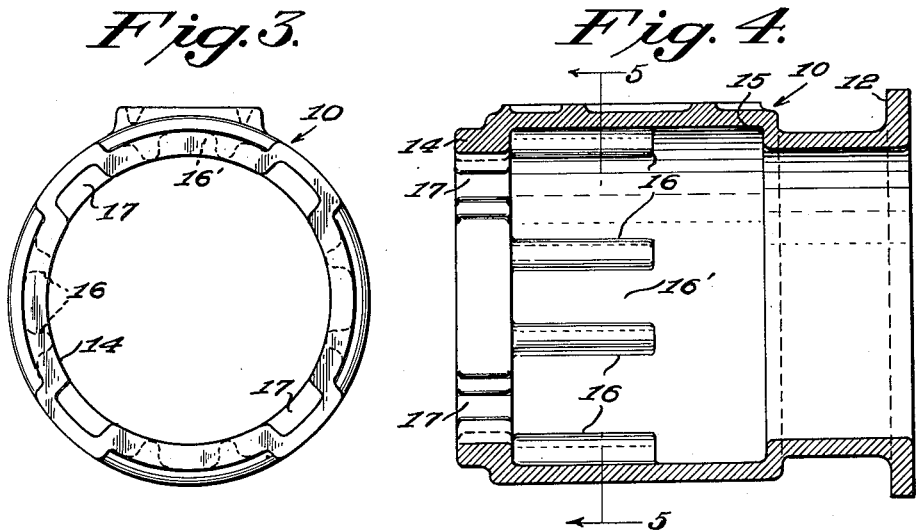
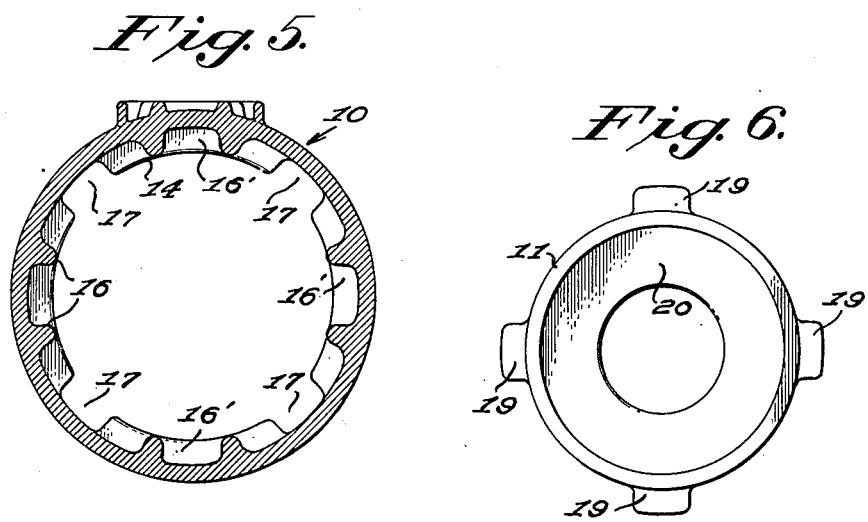

Patented Jan. 6, 1953

2,624,471

UNITED STATES PATENT OFFICE 2,624,471

CAR BUFFER

Einar O. Lunde, Wyckoff, N. J., assignor to Magor Car Corporation, New York, N. Y., a corporation of Delaware Application December 13, 1946, Serial No. 716,130

3 Claims. (Cl. 213—221)

This invention relates to a car buffer.

Car buffers of the general character herein disclosed and which comprise generally cylindrical fixed and movable members in telescopic relation, are well known and some thereof have been in extensive use.

An example of such prior structures is disclosed in the U. S. patent to Ball No. 659,781, October 16, 1900.

A primary consideration in devices of this kind is that they be capable of ready assembly and dis-assembly without the use of keys or the like, and that they be such that the movable member cannot become wholly dis-assembled from the fixed member in the event of the breakage of the spring which yieldably acts on the movable member.

While the structure of Ball, above referred to is a substantial improvement over other similar structures in that it is capable of ready assembly and dis-assembly without the use of keys or the like, the Ball structure, however, is such that in the event of spring breakage or undue compression thereof, the fixed and movable members may become dis-assembled.

A primary object of this invention is the provision of a car buffer which includes telescopic fixed and movable members having means rigid therewith for effecting the locking of the members in operative assembled position and the members and locking means being so formed as to positively preclude dis-assembly of the members when mounted on a car.

A further object of the invention is the provision of a car buffer including telescopic relatively movable members of highly simple construction and having cooperating lugs and channels for effecting operative assembly of the members and a single spring for yieldable reaction on one of the members for absorbing shock in use of the structure.

A still further object of the invention is the provision of a car buffer which is simple in construction, rugged, effective in operation, and which is capable of manufacture at relatively low cost.

These and other objects and advantages of the invention will become apparent upon a consideration of the following detailed description when taken in connection with the accompanying drawings, wherein —

Fig. 3 is a front elevational view of the fixed member or housing of Fig. 4.

Fig. 4 is a vertical axial section of the housing.

Fig. 5 is a vertical sectional view in the plane of line 5—5, Fig. 4.

Fig. 6 is a rear elevational view of the movable member, the buffer head not being shown.

Figure 1:
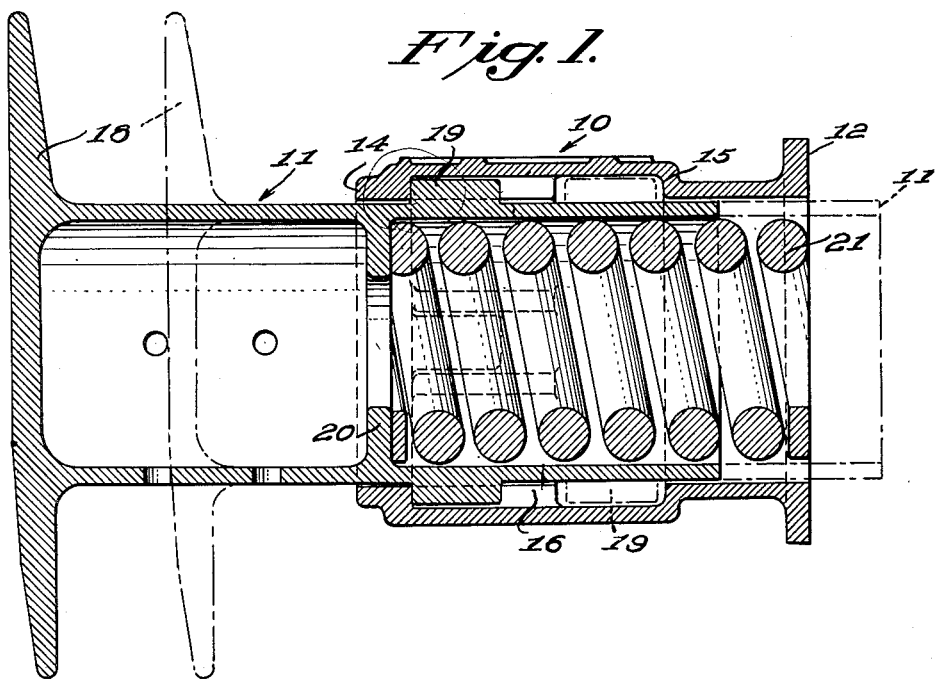
Fig. 1 is a vertical axial section of the improved buffer in accordance with a preferred embodiment thereof.
Figure 2:
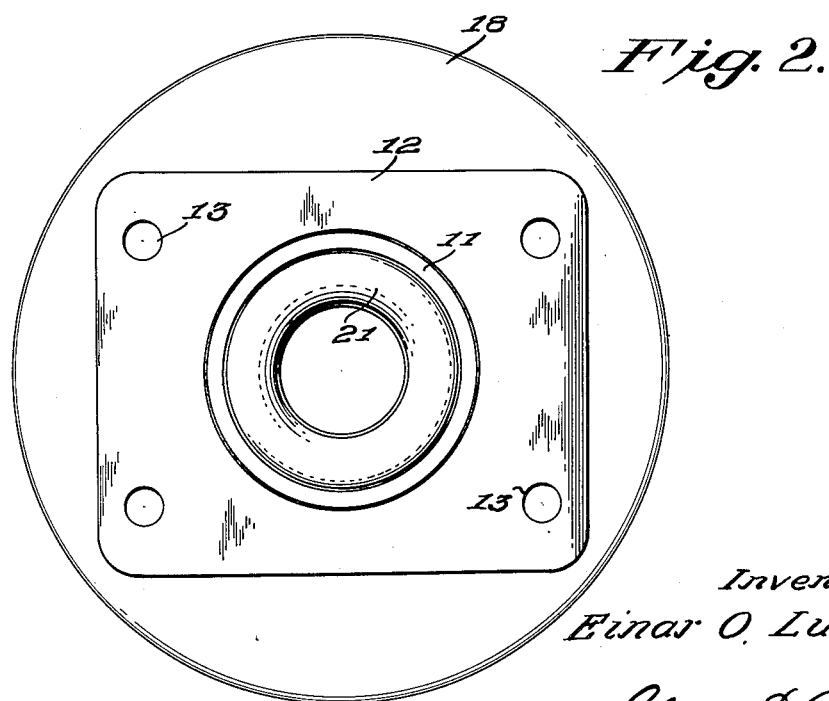
Fig. 2 is an end elevational view of the buffer as observed from the right of Fig. 1.

Referring now in detail to the drawings, 10 designates the fixed member or housing and 11 designates the movable member.

The housing 10, as is indicated in Fig. 5, is of generally cylindrical form except that it terminates in a rectangular attaching plate 12 which is provided with apertures 13 for the reception of bolts to secure the buffer to a car.

The housing 10 is diametrically enlarged intermediate its ends in the provision of a front flange 14 and a rearward shoulder 15. The enlarged portion of the member 10 is provided with circumferentially spaced elongated lugs 16 which, as indicated in Fig. 5, extend inward to an extent flush with the inner periphery of flange 14. The flange 14 is provided with recesses 17 and the lugs 16 are arranged in pairs with those of each pair providing a channel 16' equal in width to each recess 17, and the recesses 17 open between the lugs 16 of adjacent pairs thereof.

The movable member 11 is generally cylindrical except for the buffer head 18 carried by the front end thereof.

The member 11 is provided externally thereof with circumferentially spaced lugs 19 of a width to be snugly received within recesses 17 and the elongated channels 16' provided by the lugs 16 of each pair thereof.

The member 11 is provided with an internal web 20 which is engaged by one end of a heavy coil spring 21 or other cushioning means whose opposite end is adapted to engage a car to which plate 12 is secured.

Upon particular reference to Fig. 1, it will be noted that the members 10 and 11 may be easily and expeditiously assembled without overcoming the resistance of the spring 21 which in fact may not be in position during such assembly.

In assembling these members, which is done prior to attachment of the buffer to a car, member 11 is inserted into member 10 with lugs 19 alined with the recesses 17, and the lugs 19 are moved rearwardly past lugs 16, as indicated by dot and dash lines in Fig. 1, whereupon member 11 is rotated 45° and then moved forwardly with lugs 19 moving into the channels 16' whose forward ends are closed by the inner wall of flange 14.

The spring 21 is positioned with one end thereof in engagement with the web, and such spring may be of such normal length as to be slightly compressed upon positioning the plate 12 against a car to which it is then attached and with the opposite end of the spring engaged with the car.

The shoulder 15 limits rearward movement of member 11 and then acts as a stop wherein lugs 19 are positioned for entry into channels 16' upon rotation of the member 11.

It will be seen from Fig. 1 that in order to move the lugs 19 completely out of the channels 16' the inner end of member 11 must be moved substantially inwardly of plate 12, as indicated in dot and dash lines, but when plate 12 is secured to a car, member 11 cannot move to the extent indicated with the result that lugs 19 cannot be fully retracted from channels 16' and accordingly the buffer members cannot be dis-assembled when the structure is secured to a car.

A further advantage of this structure is that the heavy spring 21 need not be compressed in order to assemble the buffer members.

While I have disclosed but a single specific embodiment of my invention, such is to be considered as illustrative only, and not restrictive, the scope of the invention being defined in the sub-joined claims.

What I claim and desire to secure by U. S. Letters Patent is:

1. A car buffer comprising a housing having an inner cylindrical wall and a circumferential flange projecting inwardly of such wall at one end of the housing, a plurality of spaced pairs of elongated lugs projecting inwardly from said wall to the inner periphery of said flange and defining channels therebetween, circumferentially spaced recesses in said flange extending to the bottom thereof and disposed between the pairs of lugs, a movable cylindrical member having circumferentially spaced lugs receivable through said recesses into the spaces between the pairs of lugs, said housing having a shoulder spaced from the adjacent ends of said pairs of lugs a distance greater than the length of the second named lugs, whereby the latter may be moved beyond the pairs of lugs and upon rotation of the movable member be alined with said channels for movement thereinto upon axial movement of the movable member, said housing being completely open at its opposite end for movement of a portion of said cylindrical member beyond such end in the assembly of the housing and member, said cylindrical member having an internal web adjacent the lugs thereon, and a car engaging cushioning element disposed in said cylindrical member and having one end thereof in bearing engagement with said web.

2. A car buffer according to claim 1 wherein said housing is provided with a car engaging plate surrounding said open end for attachment of the buffer to a car and wherein said movable member comprises a cylindrical portion of a length to extend beyond said plate when said second lugs are disposed beyond the ends of the pairs of lugs.

3. A car buffer according to claim 1 wherein said movable member is provided with a buffer head at one end thereof and includes an open end in substantial spaced relation to said web, said cushioning element comprising a coil spring receivable through said open end and projecting beyond same in the operative assembly of the housing, member and spring.

EINAR O. LUNDE.

REFERENCES CITED

The following references are of record in the file of this patent:

UNITED STATES PATENTS

| Number | Name | Date |
|---|---|---|
| 1,168,448 | Westinghouse | Jan. 18, 1916 |
| 2,430,494 | Dath | Nov. 11, 1947 |

FOREIGN PATENTS

| Number | Country | Date |
|---|---|---|
| 370,528 | Germany | Mar. 3, 1923 |
| 334,158 | Great Britain | Aug. 28, 1930 |